W. A. MICHERO.
AUTOMOBILE TIRE.
APPLICATION FILED NOV. 29, 1919.
1,358,566.
Patented Nov. 9, 1920.
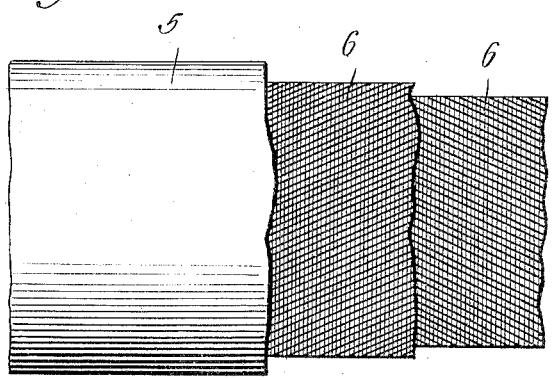
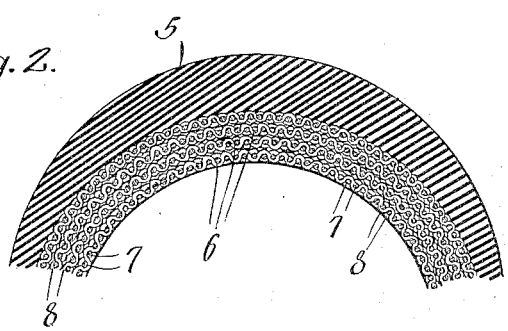
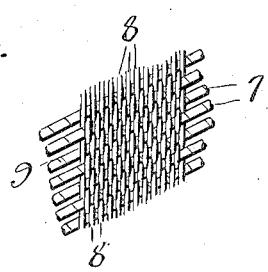
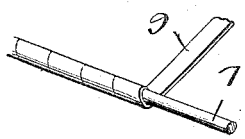
Inventor
W. A. Michero,
By Victor J. Evans
Attorney

UNITED STATES PATENT OFFICE.

WILLIAM A. MICHERO, OF FORT WORTH, TEXAS.

AUTOMOBILE-TIRE.

1,358,566.     Specification of Letters Patent.     Patented Nov. 9, 1920.

Application filed November 29, 1919. Serial No. 341,500.

*To all whom it may concern:*

Be it known that I, WILLIAM A. MICHERO, a citizen of the United States, residing at Fort Worth, in the county of Tarrant and State of Texas, have invented new and useful Improvements in Automobile-Tires, of which the following is a specification.

The present invention relates generally to pneumatic tires, comprehending particularly a tire casing, so constructed as to prevent the distortion of the tire by the excessive pressure of air contained therein; furthermore, one which should the tire be subjected to a puncture or blow-out, can be easily and effectively repaired.

I furthermore aim in constructing a tire casing which is durable and efficient in use and will withstand the shocks incident to the usage of tires of this character, and the strands forming the tire are so assembled to not only hold the tire in symmetrical form, but further preventing considerable damage or distortion of the tire, should the user unknowingly be running on a flat tire.

To this end, use is made of a tire casing or shoe constructed by arranging the wire covered strands obliquely of the tire and laces or transverse strands interwoven with the oblique strands for preventing such strands from engaging with one another and retain the same against any accidental movement with respect to the tire, thus prolonging the life of the tire and hold the obliquely arranged strands from contacting with one another.

With the above and other objects in view, the invention consists in the novel features, details of construction and combination of parts which will hereinafter be more fully set forth, illustrated in the accompanying drawing and pointed out in the appended claim.

Figure 1 is a fragmentary plan view of a portion of a tire casing;

Fig. 2 is a transverse sectional view;

Fig. 3 is a detail perspective view illustrating the manner of assembling the wires of the strands; and Fig. 4 is a detail perspective view of one of the obliquely arranged strands showing the same in a partially covered position.

Referring more particularly to the accompanying drawing, in which like characters of reference refer to corresponding parts in the several views, the character 5 denotes a pneumatic tire casing in which is arranged a series of superposed layers 6, and each layer is so formed to construct a tire casing which will prevent the tire from being easily punctured or cut by the rim of an automobile. To this end, I embed in the rubber layers 6 a plurality of wire strands 7 extending obliquely across the tire from side to side, and the strands of one layer extending in an opposite direction to the strands of the first layer, as better shown in Fig. 1 of the drawing. The obliquely arranged strands 7 are woven together in spaced relation to one another through the employment of transverse fabric strands 8. The fabric strands 8 by retaining the oblique strands 7 in spaced relation one to the other, prevent the latter from having any accidental transverse creeping movement with respect to the tire, thereby prolonging the life of the tire casing.

Among other features, I contemplate in producing a tire structure which will not only perform the function of durability and efficiency of the tire, but will further retain the tire in symmetrical form and render it possible to vulcanize rubber to the metal strands. To this end, I provide a covering for the wire denoted by the character 9 constituting a strip of fabric cloth or the like material and wrapped around each individual obliquely arranged strand 7 of the layer 6. This covering, aside from performing the uses above stated, will further caution against the rubber layers from becoming loose, because if the oblique strands were not covered, they would eventually contact or grind against one another, causing heat and wear of the casing. It will be appreciated by those skilled in the art to which this invention relates that running on a flat tire will mutilate the same to an extent to warrant its replacement by a new tire, therefore to eliminate this objection, the wires are woven into the fabric and built into the casing at such an angle as would be necessary to cause the wire to go one-half the circumference of the casing before it crossed it; whereas; if the wires were woven together at right angles to each other and built into the casing at the same angle, they would cause the distortion of the tire.

From the foregoing description, taken in connection with the accompanying drawing, the advantages of construction and the method of operation will be readily apparent to those skilled in the art to which this invention relates, and while I have described the principles of operation of the invention, together with the device which I now consider to be the best embodiment thereof, I desire to have it understood that the device shown is merely illustrative, and that such changes may be made when desired as are within the scope of the appended claim.

What is claimed as new, is:—

A tire casing constructed of a plurality of superposed layers of obliquely disposed wires in each of said layers, said wires being of a length to extend obliquely across the tire from side to side, the wires of one layer extending in an opposite direction to the wires of the adjacent layer, and a covering for each of said wires.

In testimony whereof I affix my signature.

WILLIAM A. MICHERO.